United States Patent
Powers

(10) Patent No.: US 8,204,077 B2
(45) Date of Patent: *Jun. 19, 2012

(54) AUTO-ADAPTATION TO PACKET SIZE ON A PHYSICAL MEDIUM

(75) Inventor: Randall L. Powers, Raleigh, NC (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 269 days.

This patent is subject to a terminal disclaimer.

(21) Appl. No.: 12/409,564

(22) Filed: Mar. 24, 2009

(65) Prior Publication Data

US 2009/0180479 A1    Jul. 16, 2009

Related U.S. Application Data

(63) Continuation of application No. 10/756,899, filed on Jan. 14, 2004, now Pat. No. 7,525,961.

(51) Int. Cl.
*H04J 3/16* (2006.01)
*H04J 3/22* (2006.01)

(52) U.S. Cl. ......... 370/465; 370/470; 370/471; 370/472

(58) Field of Classification Search .................. 370/229, 370/230.1, 231, 465, 470, 471, 472
See application file for complete search history.

(56) References Cited

U.S. PATENT DOCUMENTS

| | | | | | |
|---|---|---|---|---|---|
| 5,079,764 | A | * | 1/1992 | Orita et al. | 370/403 |
| 5,570,368 | A | * | 10/1996 | Murakami et al. | 370/503 |
| 7,355,971 | B2 | | 4/2008 | Jason, Jr. | |
| 2001/0048728 | A1 | * | 12/2001 | Peng | 375/354 |
| 2002/0090033 | A1 | * | 7/2002 | Anderlind et al. | 375/246 |

FOREIGN PATENT DOCUMENTS

WO    9926448    5/1999

* cited by examiner

*Primary Examiner* — Ayaz Sheikh
*Assistant Examiner* — Tarell Hampton
(74) *Attorney, Agent, or Firm* — Fogg & Powers LLC

(57) ABSTRACT

A method for automatically adapting to statically varying packet sizes at a transmission convergence layer is provided. The method includes determining if an output of calculation logic in boundary detection circuitry is equal to a next value in a data stream being received, providing output indicative of an identified packet boundary to a synchronization circuit and a packet size calculator when the output equals the next value, determining a size of a packet at the packet size calculator based on two consecutive packet boundaries identified by the boundary detection circuitry, receiving output from the boundary detection circuitry and the packet size calculator at the synchronization circuit; and one of entering, remaining, or exiting a synchronous state. The entering the synchronous state is based on a counting of consecutive good packet boundaries. The exiting the synchronous state is based on a counting of consecutive missed boundaries.

19 Claims, 4 Drawing Sheets

(12)US 8,204,077 B2

AUTO-ADAPTATION TO PACKET SIZE ON A PHYSICAL MEDIUM

This application is a continuation application of U.S. patent application Ser. No. 10/756,899 (pending), filed Jan. 14, 2004 and entitled "AUTO-ADAPTATION TO PACKET SIZE ON A PHYSICAL MEDIUM" (the '899 application). The '899 application is incorporated herein by reference.

TECHNICAL FIELD

The present invention relates generally to the field of telecommunications, and, in particular, to auto-adaptation to packet size on a physical medium.

BACKGROUND

Telecommunications networks use a variety of technologies to transmit signals between subscribers. These technologies include both analog and digital communications. One digital technology used to communicate signals in telecommunications networks is referred to as asynchronous transfer mode (ATM). ATM technology is a packet-based technology that transports data as payload in packets known as cells.

Typically, ATM packets or cells are 53 bytes long, including overhead and payload. When user data exceeds the payload capacity of an ATM cell, the user data is divided into smaller portions and transported using multiple cells as is known in the art.

A typical communication network includes a physical medium, e.g., copper wire, optical cable, wireless medium, or other appropriate physical medium, for transporting cells between ATM equipment. Conventionally, a transmission convergence (TC) layer is used to make the transition between the ATM-based equipment and the physical medium. For example, when receiving cells, the TC layer conventionally looks for a cell boundary and then counts a selected number of bytes (typically 53) and tests for another cell boundary. The TC layer then converts the received bytes into a cell for use by the ATM-based equipment.

In some systems using ATM cells, it is desirable to transport additional information between ATM equipment connected over a physical link. This additional information is sometimes referred to as "out-of-band" information. It is desirable to be able to carry this information between the ATM-based equipment within the ATM cells. This out-of-band information is typically information that is not provided for in the standard ATM cell. Further, the size of such out-of-band data may change from time to time. Unfortunately, a conventional TC layer is designed for a specific, usually standard, cell size. Thus, if an ATM product is updated to include the use of additional out-of-band information, the TC layer typically has to be redesigned to account for the new out-of-band information to be passed over the physical medium.

Therefore, there is a need in the art for reducing the complexities associated with changing the size of packets in a packet-based communication system.

SUMMARY

Embodiments of the present invention solve the problem above by providing a transmission convergence layer that detects changes in cell size and automatically adjusts to the statically varying size of packets or cells received on the physical medium. Advantageously, this allows for faster and less complicated field upgrades that change the amount of out-of-band signaling associated with non-standard cell sizes.

In one embodiment, a method for automatically adapting to statically varying packet sizes at a transmission convergence layer is provided. The method includes determining if an output of calculation logic in boundary detection circuitry is equal to a next value in a data stream being received, providing output indicative of an identified packet boundary to a synchronization circuit and a packet size calculator when the output equals the next value, and determining a size of a packet at the packet size calculator. The determining is based on two consecutive packet boundaries identified by the boundary detection circuitry. The method also includes receiving output from the boundary detection circuitry and the packet size calculator at the synchronization circuit, and one of entering a synchronous state at the synchronization circuit, remaining in the synchronous state, or exiting the synchronous state. The entering the synchronous state is based on a counting of consecutive good packet boundaries. The exiting the synchronous state is based on a counting of consecutive missed boundaries.

In another embodiment, a method for automatically adapting to statically varying packet sizes in provided. The method comprises receiving bytes in a data stream from a physical medium at a shift register in a boundary detection circuit, performing a calculation on data stored in the shift register to identify a cell boundary at calculation logic in the boundary detection circuit, comparing an output of the calculation logic with a next byte in the data stream at a comparator in the boundary detection circuit, providing output indicative of an identified packet boundary from the boundary detection circuitry to a synchronization circuit and a packet size calculator when the output of the calculation logic equals the next byte, determining a size of a packet based on two consecutive packet boundaries identified by boundary detection circuitry at the packet size calculator, receiving output from the boundary detection circuitry and the packet size calculator at a synchronization circuit, and controlling a synchronous state based on receiving the output from the boundary detection circuitry and the packet size calculator at the synchronization circuit.

In yet another example, a circuit to automatically adapt to statically varying packet sizes being received at a transmission convergence layer is provided. The circuit comprises boundary detection circuitry to continuously monitor a data stream to identify possible boundaries between consecutive packets, a packet size calculator to determine a size of packets based on two consecutive boundaries identified by the boundary detection circuitry, and a synchronization circuit to control a synchronous state of the transmission convergence layer based on output received from the boundary detection circuitry and the packet size calculator.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention allow packet-based communications systems, such as asynchronous transfer mode (ATM) systems, to adapt to changes in the size of packets that pass through the system without requiring manual modification or reprogramming of the transmission convergence (TC) layer. Advantageously, the TC layer of these embodiments automatically adapts to packets of any appropriate size without prior knowledge of packet size. Once the TC layer adapts to the current packet size, the TC layer is able to interface between packet-based equipment and the physical layer.

The TC layer adapts to changes from one fixed, static packet size to another fixed, static packet size when, for example, changes in the system are implemented. Such a change in packet size could be the result of a field upgrade to equipment. The TC layer detects the change and learns the new packet size. Once learned, the TC layer is able to act as an interface between the packet-based equipment and the physical layer.

In these embodiments, the packet size is said to be "statically varying" because the size of the packets is able to change ("varying") but stays the same ("statically") for a long enough time for useful information to be transmitted over the system. In this way, system upgrades that introduce or change out of band signaling are accomplished without any changes or modifications to the TC layer.

For purposes of this specification, the term packet is used to refer to a block of data that is transmitted as a unit in a communication system. Although the embodiments described below relate to ATM systems, the term packet as used in this specification is not limited to ATM cells. The term includes other appropriate existing or later-developed packet-based technologies.

Figure 1:
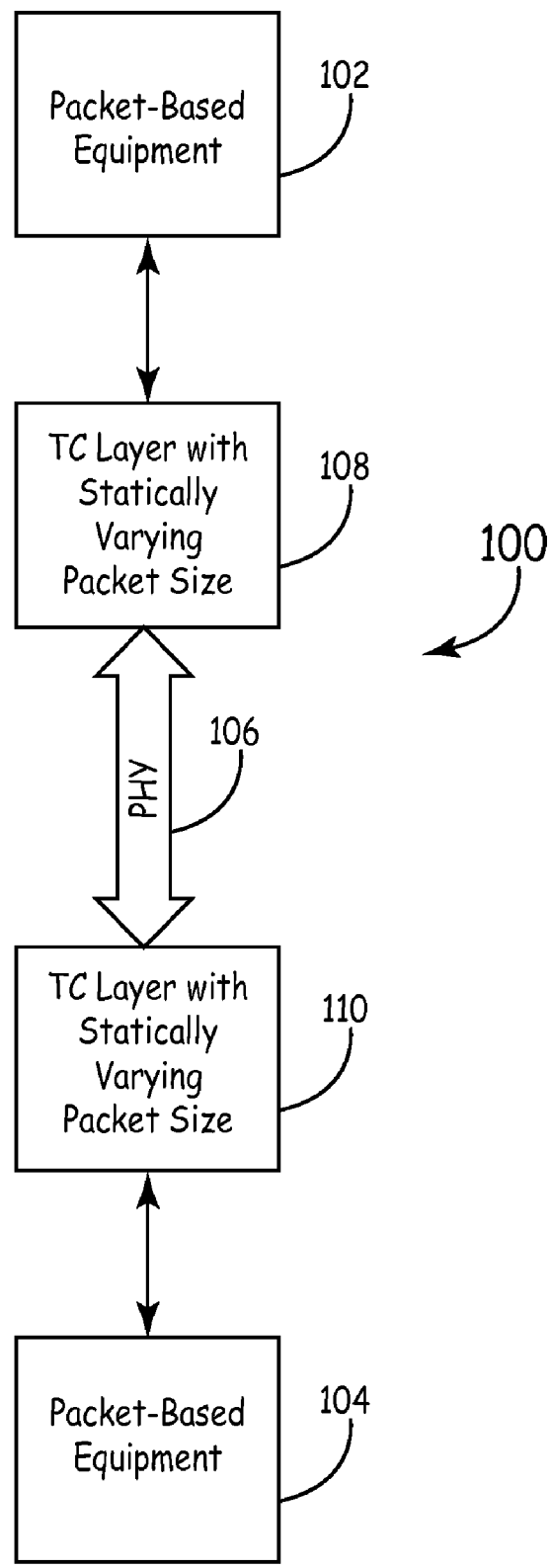
FIG. 1 is a block diagram of a packet-based communication system with a transmission convergence layer that automatically adjusts to static changes in the size of the packets.

FIG. 1 is a block diagram of an embodiment of a system, indicated generally at 100, with automatic adaptation to packet size in transmission convergence layers 108 and 110 according to the teachings of the present invention. Advantageously, system 100 automatically adapts to static changes in packet size to allow transmission of packets of varying size to be transmitted over a physical medium without requiring time consuming modification of the transmission convergence (TC) layer.

System 100 allows for communication between packet-based equipment, e.g., packet-based equipment 102 and 104, over a physical medium 106. In one embodiment, packet-based equipment 102 and 104 each comprise ATM-based communication equipment. Physical medium 106 comprises any one of copper wire, fiber optic cable, wireless medium or other appropriate physical medium for transmitting signals between packet-based equipment. Transmission convergence layers 108 and 110 provide the interface between packet-based equipment 102, 104, respectively, and physical medium 106.

In operation, system 100 transports packets of statically varying size between packet-based equipment 102 and 104 over physical medium 106. Transmission convergence layers 108 and 110 adapt to the size of packets received over physical medium 106. This adaptation is done on a static basis. In one embodiment, the TC layers 108 and 110 look for a specified number of packets in a row with the same size, e.g., the same number of bytes. When detected, the TC layer enters a synchronous state and uses the identified packet size in processing further packets. During the synchronous state, the TC layers monitor packets for changes in the packet size. When enough packets of a different size are received, the TC layer exits the synchronous state and attempts to resynchronize to a new, static packet size.

Figure 2:
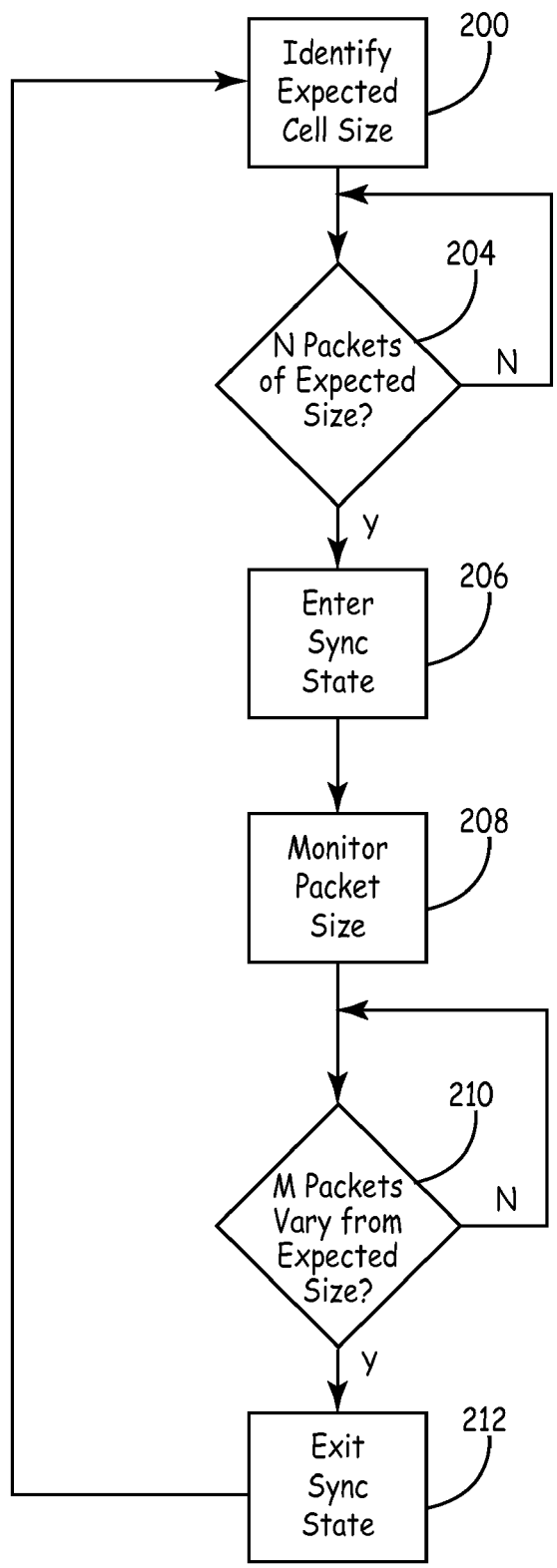
FIG. 2 is a flow chart of a process for automatically adapting the size of packets in a transmission convergence layer.

To illustrate the process for adapting to a new cell size, an example is given with respect to TC layer 108 using a process shown in FIG. 2. TC layer 108 receives a stream of bytes over physical medium 106. This stream of bytes includes packets of a static, unknown size. First, TC layer 108 identifies an expected packet size at block 200. In one embodiment, TC layer 108 determines the packet size by identifying two consecutive cell boundaries in a stream of ATM data packets. In one embodiment, the cell boundaries are identified by calculating a header error check (HEC) code on a consecutive number of bytes and comparing the value with a subsequent byte in the data stream. When the calculated HEC value is the same as the subsequent byte in the data stream, a boundary may have been identified. The separation of two cell boundaries establishes a potential cell size.

Next, at block 204, the method proceeds to identify N additional packets of the same size using the calculated, expected packet size. In one embodiment, the method looks for eight additional cell boundaries that correspond to eight ATM cells of the expected size. When the N consecutive packets match the expected packet size identified above, the method enters a synchronous or sync state at block 206 in which the TC layer is synchronized to the correct packet size for the stream of data transmitted over the physical medium 106. At this point, the method proceeds to process additional bytes in the data stream.

The method further determines when the TC layer receives enough packets of the wrong size so that synchronization of the TC layer with the correct packet size is lost. At block 208, the method monitors the size of packets in the data stream during the synchronous state. When the size of M packets received in the synchronous state varies from the expected packet size as determined at block 210, the TC layer 108 exits the synchronous state at block 212. The TC layer further returns to block 200 to re-synchronize to the packet size being received over the physical medium.

Figure 3:
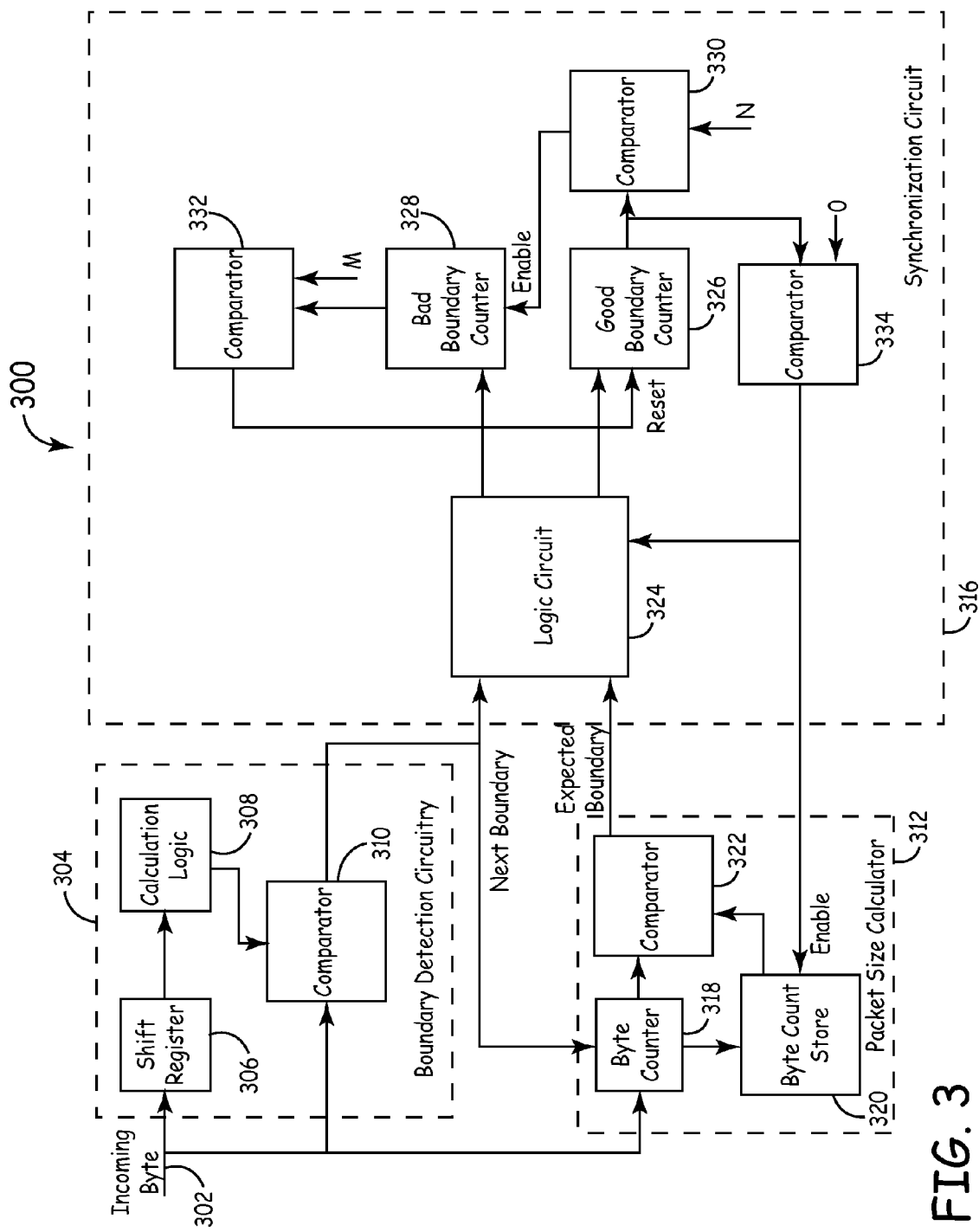
FIG. 3 is a block diagram of an embodiment of a circuit for a transmission convergence layer that automatically adapts to a static change in the packet size of a communication system.

FIG. 3 is a block diagram of an embodiment of a circuit, indicated generally at 300, for a transmission convergence layer that automatically adapts to a static change in the packet size of a communication system. Circuit 300 adapts the operation of the transmission convergence layer to the size of packets in a data stream received at input 302. Circuit 300 includes three main components: boundary detection circuitry 304, packet size calculator 312, and synchronization circuit 316. Each of these components is described in detail below.

Boundary detection circuitry 304 continuously monitors the data stream at input 302 to identify possible boundaries between consecutive packets. Boundary detection circuitry 304 includes shift register 306, calculation logic 308, and comparator 310. Shift register 306 is coupled to receive the incoming data stream. In one embodiment, shift register 306 is sized to receive a number of bytes equal to the number of bytes in the header of the packets. For example, in an embodiment using ATM cells, shift register 306 is a four byte shift register corresponding to the four bytes of the ATM cell header excluding the header error check code (HEC) byte. Calculation logic 308 is coupled to shift register 306. Calculation logic 308 performs a calculation on the data stored in shift register 306 to identify a cell boundary. In one embodiment, calculation logic 308 comprises circuitry that calculates a HEC code based on four bytes of the incoming data stream stored in shift register 306. Further, comparator 310 is coupled to the output of calculation logic 308 and the incoming data stream input 302. Comparator 310 compares the output of calculation logic 308 with the next byte in the data stream. When the two values provided to comparator 310 are equal, the boundary detection circuitry 304 has identified a boundary since the calculated HEC value from calculation logic 308 equals the received HEC value (the byte following the four bytes stored in the shift register 306.) The comparator 310 provides a logic output signal, labeled "NEXT BOUNDARY," indicating whether a boundary between two packets has been identified. When the output of logic 308 is equal to the next value in the data stream, the boundary detection circuitry 304 provides a logic high output indicating that a boundary has been identified. The boundary detection circuitry 304 constantly monitors the incoming data stream to identify possible boundaries between packets.

Packet size calculator 312 determines the size of the packets for the TC layer based on two consecutive boundaries identified by boundary detection circuitry 304. Packet size calculator 312 includes byte counter 318. Byte counter 318 is incremented with each byte of data received at input 302. Thus, byte counter 318 identifies the number of bytes received since the last boundary was identified. When the next boundary is identified, the value in byte counter 318 indicates the number of bytes in the current packet. The value in byte counter 318 is reset with each identified boundary. Further, packet size calculator 312 includes byte count store 320, e.g., a register. Byte count store 320 is loaded with the value in byte counter 318 after the first two consecutive packet boundaries are identified.

This value stored in byte count store 320 is used by synchronization circuit 316 to determine whether subsequent boundaries detected by boundary detection circuitry 304 occur with the expected interval. Packet size calculator 312 also includes comparator 322. Comparator 322 compares the value in byte count store 320 (the expected cell size) with the value in byte counter 318 (the number of bytes since the last boundary). Comparator 322 provides a signal "EXPECTED BOUNDARY" to synchronization circuit 316 that indicates that a boundary is expected. If the two values received at comparator 322 are equal, the EXPECTED BOUNDARY signal is a high logic level. Otherwise, EXPECTED BOUNDARY is a low logic value.

Synchronization circuit 316 is the final component of circuit 300. Synchronization circuit 316 includes a logic circuit 324 that is coupled to receive both the NEXT BOUNDARY signal from boundary detection circuitry 304 and the EXPECTED BOUNDARY signal from packet size calculator 312. Logic circuit 324 provides output signals to two counters: good boundary counter 326 and bad boundary counter 328. Good boundary counter 326 is used to count the number of consecutive good packet boundaries that are identified once the packet size is determined by packet size calculator 312. A good packet boundary corresponds to the NEXT BOUNDARY and EXPECTED BOUNDARY signals simultaneously providing high logic levels to logic circuit 324. The value in good boundary counter 326 is provided to comparator 330. Comparator 330 also receives an input indicating the number, N, of consecutive packet boundaries required to enter into a synchronous state. When good boundary counter 326 indicates that N consecutive boundaries have lined up with expectations, synchronization circuit 316 enters the synchronous state and the good boundary counter 326 ceases to increment.

Once in the synchronous state, synchronization circuit 316 monitors further data in the data stream to determine if synchronization is lost, e.g., to determine when the packet size is changed. Synchronization circuit 316 uses bad boundary counter 328 to determine loss of synchronization. When entering the synchronous state, comparator 330 enables bad boundary counter 328. Bad boundary counter 328 counts the times that a cell boundary did not occur with the expected interval. This is determined based on the signals NEXT BOUNDARY and EXPECTED BOUNDARY not indicating a boundary the expected number of bytes after the last boundary was found. Bad boundary counter is enabled to increment only at the time of the expected boundary. Bad boundary counter 328 provides the number of consecutive missed boundaries to comparator 332. When M consecutive boundaries are missed, the comparator 332 resets good boundary counter 326. This places circuit 300 back into an unsynchronized state. In this state, comparator 334 provides a signal to byte count store 320 to allow a new value to be stored so that the circuit 300 can synchronize to a new packet size.

In operation, circuit 300 synchronizes to a packet size for a communication link with a statically varying packet size. Boundary detection circuitry 304 monitors a stream of packets to identify boundaries between packets. When in an unsynchronized state, packet size calculator 312 determines the expected size of the packets based on two initial boundaries identified by boundary detection circuitry 304. Once the expected size is determined, synchronization circuit 316 counts the number of boundaries that match the expected interval between boundaries using good boundary counter 326. When this count reaches a defined level, N, e.g., 8 boundaries, the synchronization circuit 316 enters a synchronized state in which the static size of the cells is known. In this state, the synchronization circuit monitors the boundaries between cells. When a cell boundary does not occur at the expected time, a bad boundary counter 328 is incremented. If M sequential, e.g., 7, packet boundaries fail to occur at the right time, the synchronization circuit 316 goes out of its synchronized state. This allows the packet size calculator to recalculate the size of packets since the size may have changed due to a system upgrade. Once calculated, the process of synchronizing proceeds again as described above.

Figure 4:
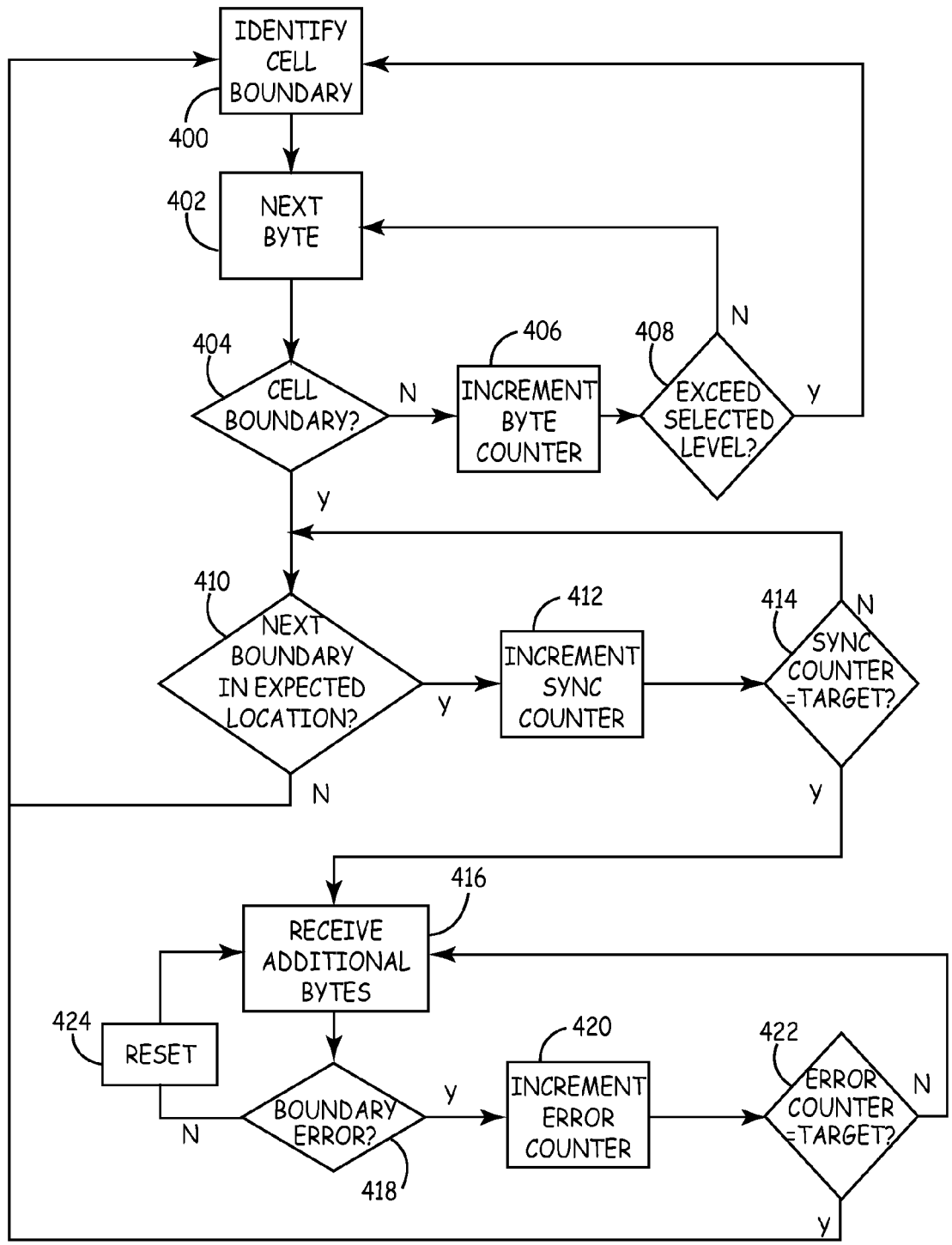
FIG. 4 is a flow chart of another process for automatically adapting the size of packets in a transmission convergence layer.

FIG. 4 is a flow chart of another process for automatically adapting the size of cells in a transmission convergence layer according to the teachings of the present invention. The process begins at block 400 and identifies a first cell boundary. In one embodiment, the process calculates a header error check (HEC) value based on a number of consecutive bytes received in a stream of packets. The process further compares the calculated HEC value with the next byte of the data stream to determine whether a cell boundary has been identified. Essentially, this process identifies the boundary because the bytes used to calculate the HEC value and the byte that matched the calculated HEC value are determined to be a header of a packet.

The method proceeds to identify the next cell boundary. At block 402, the process receives the next byte. At block 404 the process determines whether the byte occurs at a cell boundary. Again, the HEC value is used in one embodiment to identify the cell boundary. If the byte does not correspond to a boundary, then the process proceeds to block 406 and increments a byte counter. The byte counter is used to determine the cell size. Through this loop, each time a byte is received that is not the next boundary, this counter is incremented. Thus, when the next boundary is identified, the counter reflects a value related to the size of the cells or packets being received over the physical medium.

Block 408 limits the allowable cell size to a practical level. For example, cell size can be limited to less than 65 bytes. This provides up to 13 bytes for transmission of out-of-band information. At block 408, the process determines whether the byte counter has exceeded a selected level. If so, the process returns to block 400 and restarts the process for determining the cell size by looking for the next boundary. If the selected level has not been exceeded, the process returns to block 402 and receives the next byte. By limiting the cell size to a selected level, the process is able to restart more quickly if a boundary is missed at block 404.

At block 410, the process begins to verify the identified cell size. The process first determines whether the next boundary occurs at the expected location. If so, the process increments a sync counter. At block 414, the process determines whether the sync counter has reached a target level. If not, then the process returns to block 410 to identify the next expected boundary location. At block 410, if the process determines that a boundary did not occur at the expected location in the data stream, the process returns to block 400. Once the target number of consecutive boundaries (e.g., cells) has been successfully received, e.g., all cells of the same, expected size, the method proceeds to block 416 to process cells received over the physical layer. During this processing, the TC layer is declared to be in a sync state. Thus, cells are expected to be of the size identified by the process. If, however, any cells violate this expectation, corrective action may need to be taken.

At block 418, the method determines if there has been a boundary error, e.g., a boundary did not occur at the point expected based on the derived packet size. If there has been a boundary error, e.g., a cell of a different size than expected, the method proceeds to block 420 and increments an error counter. At block 422 the process determines whether the error counter has reached a target level. If so, the method restarts the process of identifying the cell size. If not, the method returns to block 416 to receive and process additional bytes using the same identified cell size. If at block 418, the process determines that the there was no boundary error, the method proceeds to reset the error counter at block 424 and returns to block 416 and processes additional bytes.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions stored on a machine readable medium to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices or machine readable medium suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method for automatically adapting to statically varying packet sizes at a transmission convergence layer, the method comprising:
    determining if an output of calculation logic in boundary detection circuitry is equal to a next value in a data stream being received;
    providing output indicative of an identified packet boundary to a synchronization circuit and a packet size calculator when the output equals the next value;
    determining a size of a packet at the packet size calculator, the determining being based on two consecutive packet boundaries identified by the boundary detection circuitry;
    receiving output from the boundary detection circuitry and the packet size calculator at the synchronization circuit; and
    one of entering a synchronous state at the synchronization circuit, remaining in the synchronous state, or exiting the synchronous state based on the output received from the boundary detection circuitry and the packet size calculator at the synchronization circuit, wherein the entering the synchronous state is based on a counting of consecutive good packet boundaries, and the exiting the synchronous state is based on a counting of consecutive missed boundaries.

2. The method of claim 1, wherein entering the synchronous state comprises:
    counting a number of consecutive good packet boundaries until the synchronization circuit enters a synchronous state;
    receiving at a comparator in the synchronization circuit a target level indicative of a number of consecutive packet boundaries required to enter into the synchronous state;
    receiving at the comparator in the synchronization circuit a value in a good boundary counter; and
    entering the synchronous state when the value in the good boundary counter equals the target level.

3. The method of claim 2, wherein exiting the synchronous state based on the counting of the consecutive missed boundaries comprises:
    enabling a missed boundary counter responsive to entering the synchronous state;
    incrementing the missed boundary counter responsive to a determination that a boundary error has occurred;
    determining if the missed boundary counter has reached a target level for the consecutive missed boundaries; and resetting the good boundary counter responsive to the error counter reaching the target level for the consecutive missed boundaries, wherein the boundary detection circuitry exits the synchronized state.

4. A method for automatically adapting to statically varying packet sizes, the method comprising:

receiving bytes in a data stream from a physical medium at a shift register in a boundary detection circuit;

performing a calculation on data stored in the shift register to identify a cell boundary at calculation logic in the boundary detection circuit;

comparing an output of the calculation logic with a next byte in the data stream at a comparator in the boundary detection circuit;

providing output indicative of an identified packet boundary from the boundary detection circuitry to a synchronization circuit and a packet size calculator when the output of the calculation logic equals the next byte;

determining a size of a packet based on two consecutive packet boundaries identified by boundary detection circuitry at the packet size calculator;

receiving output from the boundary detection circuitry and the packet size calculator at a synchronization circuit; and controlling a synchronous state based on receiving the output from the boundary detection circuitry and the packet size calculator at the synchronization circuit.

5. The method of claim 4, wherein controlling the synchronous state comprises:

entering the synchronous state based on a counting of consecutive good packet boundaries; and exiting the synchronous state based on a counting of consecutive missed boundaries.

6. The method of claim 5, wherein entering the synchronous state based on a counting of consecutive good packet boundaries comprises:

counting a number of consecutive good packet boundaries until the synchronization circuit enters a synchronous state;

receiving a value in a good boundary counter and a target level to enter a synchronous state at a comparator in the synchronization circuit; and entering the synchronous state when the good boundary counter indicates that the target level of consecutive boundaries have been counted.

7. The method of claim 6, wherein exiting the synchronous state based on a counting of consecutive missed boundaries comprises:

enabling a missed boundary counter in the synchronization circuit responsive to entering the synchronous state;

incrementing the missed boundary counter responsive to a determination that a boundary error has occurred;

determining if the missed boundary counter has reached a target level for the consecutive missed boundaries; and resetting the good boundary counter responsive to the error counter reaching the target level for the consecutive missed boundaries.

8. The method of claim 7, wherein exiting the synchronous state based on a counting of consecutive missed boundaries further comprises resetting the good boundary counter responsive to the error counter reaching the target level.

9. The method of claim 4, wherein determining the size of the packet based on two consecutive boundaries identified by the boundary detection circuitry at the packet size calculator comprises:

incrementing a byte counter in the packet size calculator with each byte of data received from the physical medium until a boundary is identified;

loading a value in a register after a first of two consecutive packet boundaries are identified; and resetting the value in the byte counter with each identified packet boundary.

10. The method of claim 4, wherein providing the output indicative of the identified packet boundary from the boundary detection circuitry comprises providing a logic output signal that indicates a NEXT BOUNDARY.

11. The method of claim 4, wherein providing the output indicative of the identified packet boundary from the boundary detection circuitry comprises providing a logic high output.

12. The method of claim 4, wherein receiving a stream of bytes from the physical medium at a shift register comprises receiving a stream of bytes from the physical medium at a shift register sized to receive a number of bytes equal to the number of bytes in the header of the packets.

13. The method of claim 12, wherein the shift register is a four byte shift register corresponding to four bytes of an asynchronous transfer mode cell header excluding a header error check code byte.

14. The method of claim 4, further comprising calculating a header error check code based on four bytes of the incoming data stream stored in the shift register.

15. A circuit to automatically adapt to statically varying packet sizes being received at a transmission convergence layer, the circuit comprising:

boundary detection circuitry to continuously monitor a data stream to identify possible boundaries between consecutive statically varying packets;

a packet size calculator to determine statically varying packet sizes of statically varying packets based on counting bytes between two consecutive boundaries identified by the boundary detection circuitry; and a synchronization circuit to control a synchronous state of the transmission convergence layer based on output received from the boundary detection circuitry and the packet size calculator, and based on a count of consecutive good packet boundaries and a count of consecutive missed boundaries.

16. The circuit of claim 15, wherein the boundary detection circuitry comprises:

a shift register coupled to receive the data stream;

a calculation logic operable to perform a calculation on data stored in the shift register in order to identify a cell boundary; and a comparator to compare the output of the calculation logic with a next byte in the data stream, wherein, when the two values provided to comparator are equal, the boundary detection circuitry identifies a possible boundary.

17. The circuit of claim 16, wherein the packet size calculator comprises:

a byte counter coupled to receive the data stream and configured to identify the number of bytes received since a last possible packet boundary was identified;

a byte count store to store an expected cell size; and a comparator to compare values in the byte count store and the byte counter and to output a logic level to the synchronization circuit.

18. The circuit of claim 17, wherein the synchronization circuit comprises:

a logic circuit that is coupled to receive the output logic levels from the comparators in the boundary detection circuitry and the packet size calculator;

a good boundary counter to count the number of consecutive good packet boundaries identified; and a missed boundary counter to count the times that a boundary is not identified with an expected interval, wherein the logic circuit provides output signals to the good boundary counter and the missed boundary counter.

19. The circuit of claim 18, wherein the synchronization circuit further comprises:

a first comparator to receive an input indicating the number of consecutive packet boundaries required to enter into a synchronous state, to receive an input from the good boundary counter, and to enable the missed boundary counter when the circuit enters a synchronization state; and a second comparator to receive a number of consecutive missed boundaries from the missed boundary counter and to reset the good boundary counter when a target level of consecutive boundaries are missed, wherein the resetting of the good boundary counter places the circuit into an unsynchronized state.

* * * * *